(12) United States Patent
Coon et al.

(10) Patent No.: US 6,356,615 B1
(45) Date of Patent: Mar. 12, 2002

(54) PROGRAMMABLE EVENT COUNTER SYSTEM

(75) Inventors: Brett Coon, Milpitas, CA (US); David Keppel, Seattle, WA (US); Charles R. Price, Sunnyvale, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 09/417,930

(22) Filed: Oct. 13, 1999

(51) Int. Cl.[7] ................................................. G07C 3/00
(52) U.S. Cl. ............................................ 377/16; 377/2
(58) Field of Search ...................................... 377/2, 16

(56) References Cited

U.S. PATENT DOCUMENTS 4,817,118 A * 3/1989 Wilburn et al. ............... 377/16
5,596,390 A * 1/1997 Sawada ......................... 377/16
5,790,625 A * 8/1998 Arimilli ......................... 377/16

* cited by examiner

Primary Examiner—Margaret R. Wambach
(74) Attorney, Agent, or Firm—Stephen L. King

(57) ABSTRACT

Certain events occurring throughout a microprocessor chip are monitored by a counter system (1) containing a number of digital electronic counters (3, 5, 7 & 9) consolidated at a single location on the processor chip. Those events are communicated to the counter system via electrical leads extending to those functional units in the processor responsible for signaling an event occurrence. Under program control, each counter can be selectively connected (11, 13, 15 & 17) to a selected one of the various functional event producing units. By means of selection logic (19, 21, 23 & 25) separate events originating from multiple functional units may be logically combined, whereby the event counted is a Boolean logic combination of multiple underlying events.

17 Claims, 2 Drawing Sheets

PROGRAMMABLE EVENT COUNTER SYSTEM

FIELD OF THE INVENTION

This invention relates to digital computer systems, and, more particularly, to a built-in on-chip programmable electronic event counter system useful in analyzing performance of operation of the digital computer system, in debug of the system, and as a source of event based interrupts.

BACKGROUND

Electronic counters are known devices and appear in many forms. For one, as a software counter programmed to be executed by a microprocessor. Another as a digital electronic counter. As known, such counters may be configured to increment, that is, count-up, or decrement, count-down from a prescribed number. Further, they may be programmed or hard-wired to respectively increment to or decrement from a specific number set therein by the respective software program or hard wiring.

Counters have long been used as a component of digital systems, including digital processing systems, with which the present invention is concerned. When used in digital processing systems, counters most often are "built-in" to the semiconductor chip. That is, they are formed on the same semiconductor die on which other semiconductor components, functional units, of the digital processing system are manufactured and with which they are used during operation, such as the processor. As example, applicant was informed that the PENTIUM PRO processor contains two registers that may be programmed to run as counters. They are used for control purposes within the processor, serving to generate a control signal, an interrupt, on underflow or overflow and that interrupt is used in the operation of the microprocessor.

In some digital systems, electronic counters have been used as timers. By directly or indirectly counting high frequency clock pulses, a decrementing counter is able to step down the pulse repetition rate to a lower rate, producing a greater time spacing between output pulses. The pulse-to-pulse time defines a precise time period. Coupled to a flip-flop, a pulse of defined time duration can be produced.

Digital electronic counters have also served to count events. The present invention also relates to digital electronic counters and to event counting in a more esoteric application, to count events and combination of events occurring during the operation of a microprocessor.

A principal object of the invention, thus, is to provide a more efficient system for collecting information from functional units within a digital processing system that tells of events occurring during processor system operation.

A further object of the invention is to provide a more adjustable system for collecting event information from the functional units of a microprocessor by consolidating a number of event counters at a single location on the microprocessor chip and permitting selection of the number (and kind) of event producing functional units to monitor.

An additional object of the invention is to provide a programmable event counting system that is able to count combinations of events arising during a cycle of microprocessor operation wherein the events are combined in accordance with prescriptions of Boolean logic.

And a still additional object of the invention is to provide a processor system which incorporates a hardware event counter to automatically switch between alternative processor functions when a count of an event or a combination of events attains a predetermined number, such as by generating an interrupt, avoiding the necessity for software to handle the event determination and switching functions.

SUMMARY

The foregoing objects are realized by an event counter system formed by consolidating a number of programmable digital electronic counters and multiplexers together at one location on the processor chip. Each multiplexer is associated with at least one of the counters. The multiplexers serve as the gateway of the counter to event information generated at the functional units of the processor.

The plural input channels in each multiplexer are each coupled to multiple locations in the various functional units of the processor whose actions are to be counted, directly or indirectly, and each such functional unit contains a plurality of different outputs coupled to the inputs of the foregoing multiplexers. This permits count of any of the multiple event generating actions of those functional units. As an advantage, the invention avoids the necessity for incorporating separate counters for each of the multiple event generating actions of the individual functional units.

The counter system serves as a source of information on events occurring in the processor system. It is an integral part of the processor chip. And the counter system serves to generate interrupts that facilitate processor operation.

The counter system is programmable under software control. The count taken, the functional unit (or units) monitored for an event, and the source within each functional unit (or units) to be monitored or combined and monitored as a combination signal is selected by software supplied over appropriate buses. The counter system may even be programmed or reprogrammed "on the fly" by the executive program of the processor to use the counter hardware in conjunction with a program operation.

As an additional aspect to the invention, the system includes a combinational logic unit ("signal combiner") that is able to combine at least two different events in accordance with a Boolean logic criteria, selected under software control, to provide a "combined" event for count. The outputs of the multiplexer are provided to the counters through an associated one of multiple signal combiners. Different events may be logically combined to create combinational events to count. Such events may include, as example, the concurrent occurrence during a clock cycle of two selected events (X AND Y), the occurrence of one event, but not the other (X NOT Y or Y NOT X) and the like bitwise Boolean functions, in addition to individual events produced by a single functional unit (X ONLY or Y ONLY). As an advantage, extremely useful correlations of multiple event inputs may be formulated for count in regard to complex operations occurring within the computer system.

The foregoing and additional objects and advantages of the invention together with the structure characteristic thereof, which was only briefly summarized in the foregoing passages, becomes more apparent to those skilled in the art upon reading the detailed description of a preferred embodiment of the invention, which follows in this specification, taken together with the illustration thereof presented in the accompanying drawings.

DETAILED DESCRIPTION OF THE PREFERRED EMBODIMENT

Figure 1:
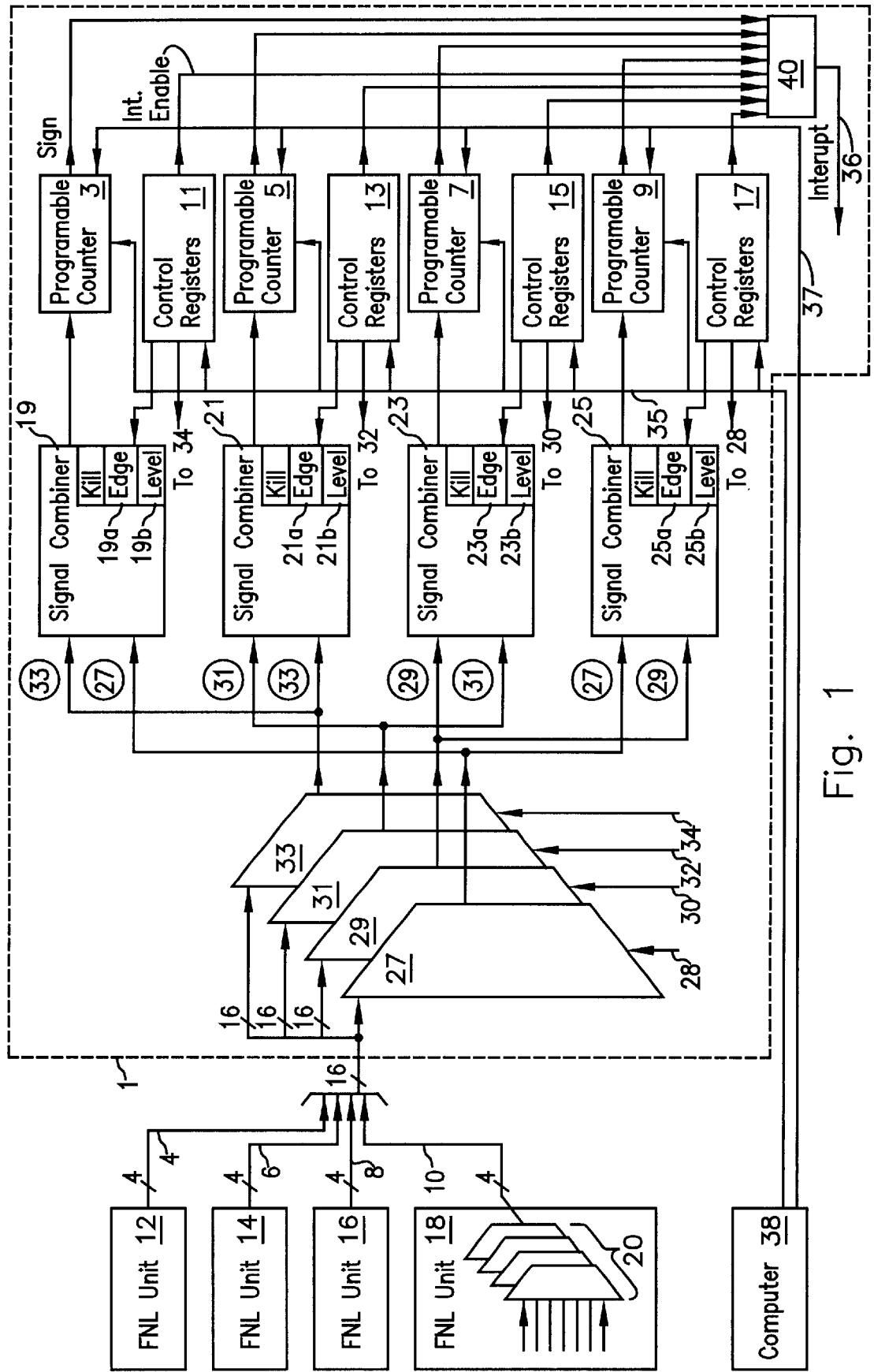
FIG. 1 is a block diagram of a preferred embodiment of the invention.

Reference is made to FIG. 1 which illustrates a preferred embodiment of a counter system 1 in block diagram form. The counter includes four programmable counters 3, 5, 7 and 9, four counter control registers 11, 13, 15 and 17, four signal combiners 19, 21, 23 and 25 and four multiplexers ("MUXs") 27, 29, 31 and 33. The foregoing components are grouped together physically, as represented by the dash lines surrounding the counter system, embedded at a selected location on the same semiconductor die on which the microprocessor and its related functional units, only some of which are symbolically illustrated, are fabricated.

A pair of buses 35 and 37 connect respectively to the control registers and to the programmable counters. Each of those buses contain data and control lines which extend to the address and data inputs of the respective registers and counters. Those lines extend to other portions of the computer, represented at block 38 and which may incorporate the semiconductor chip containing the counter system and functional elements, from which the digital data and address information originates to program each of the counter and control register.

The interrupt outputs of the various counters are coupled to a gating circuit 40. Each control register provides an interrupt enable output to that gating circuit as well. An interrupt bus 36 extends from the gating circuit enabling an interrupt, generated by any of the counters, to be outputted by that gating circuit to other units in computer 38.

Each counter and each control register is individually addressable under software control, as later herein described in greater detail. The counters are programmable. They may be written to or read by software. They may be of any size. In a practical embodiment of the present invention the counters are 32-bit counters.

Each control register, 19, 21, 23 and 25, is associated with a respective one of the four counters and with a respective one of the signal combiner circuits. The control register are addressable and written to under software control. Once the information is written into (registered) the control register, the control register supplies the select information, later herein described in greater detail, to the associated signal combiner, selects which input the associated MUX is to pass, the type of signal to detect, the interrupt priority and the action to be taken in the event a kill (stop) signal is generated by the processor.

Each MUX 27, 29, 31 and 33 contains multiple inputs from each of the functional units in the processor being served. Those inputs are selectively multiplexed to a signal combiner and, thence, to an associated counter (or pair of counters) under program control, as hereafter described in greater detail, so that only the selected one of the respective multiple inputs of the MUX, representing only one of the multiple functional units 12, 14, 16, and 18, illustrated symbolically in blocks, is active, and is able to pass an event signal to the output of the MUX for the counting process.

It should be realized that, as used herein, the term functional unit refers to any of the individual digital electronic components on the semiconductor chip that performs a function during the processing of a software application being run in a digital computer system, such as those functional elements that together form or define a microprocessor, and is not intended to be limited to the particular units that execute instructions. The details of the functional units, some of which were briefly described in the background to this description, are not necessary to the understanding of the invention and need not be described. Those functional units may comprise the program counter, data cache, bus interface, instruction execution, store buffer, integer units, floating point units and the like.

In the practical embodiment and application illustrated, each MUX receives four separate inputs from each functional unit, and the total number of inputs applied to each MUX is sixteen. It should be appreciated that some of the processors functional units are (or may be) capable of providing more than four event signals, and, hence, in other practical embodiments greater numbers of inputs (and larger MUXs) may be substituted or MUXs may be cascaded, as elsewhere herein described.

The inputs to each MUX are supplied via the buses 4, 6, 8, and 10, each of which contains a sufficient number of leads to handle the individual events originating from the respective functional unit. The foregoing leads of each such bus extend to different output locations within a respective individual functional unit of the processor, that is located elsewhere on the semiconductor chip, and can serve as individual sources of events that the software scientist may wish to select for monitoring. As example, such units could be the program counter, data cache, bus interface, instruction execution, store buffer, integer units, floating point units.

By design each of the microprocessors functional units contains at least four different event output signals, any of which may be selected and monitored for an event associated therewith. Hence, in the practical embodiment buses 4, 6, 8 and 10, each containing four individual leads, extend from counter system 1 to respective processor functional units 12, 14, 16, and 18. As is apparent, if a functional unit, however, is designed to contain fewer sources of event signals, say three, the extra lead in the bus may be omitted or left unused.

The number of locations chosen for each functional unit in this embodiment, four, is thought adequate. It should be understood that the system is not limited to monitoring just four functional units and is not limited to monitoring just four event generating locations in each functional unit. One frequently finds that some functional units contain more than four locations that are worthwhile as potential sources of useful event information. To accommodate a greater number of locations in a given functional unit, that functional unit may contain (or should be modified to contain) associated local event select logic, such as a local MUX to select the particular set of four events for transmittal to the event counting system via the identified buses. That local select logic, like the described event counters, should also be software controlled.

Further, when the number of possible individual functional units to be monitored on the processor chip exceeds four, then it is necessary for the functional unit instead to include another MUX unit located on the semiconductor chip remote from the counter control unit, essentially "tree-ing" two MUXs together. The latter arrangement is illustrated in functional unit 18 in the figure.

As shown, functional unit 18 contains a group of four MUXs, 20 and in effect constitutes a "virtual" functional unit. Each of the individual MUXs in the group are connected by four lead buses to actual functional units. The output of functional unit 20 is thus that of the selected one of the many actual functional units connected to one of the four inputs to one of the group of four MUXs that is selected and enabled. The means for making that selection is also preferably program controlled. Provision for still additional numbers of functional units requiring monitoring can be added in like manner. The foregoing MUXs may be included in a region of the chip containing the described counter system.

Each MUX also contains a selection input bus 28, 30, 32, and 34 that is coupled to the control registers 11, 13, 15 and 17. The particular MUX input that is to be outputted by the MUX is selected by a selection code, suitably a binary code, applied to its respective selection input. The selection code is applied through respective associated ones of the control registers 11, 13, 15 and 17, later herein discussed in the description of operation of the counter unit.

Through the control registers, signal combiners 19, 21, 23 and 25 are programmable to define the criteria of a combination of individual events. Logic selection for those combiners is made through the information placed in an associated control register. As shown, control register 11 supplies the selection in signal combiner unit 19, register 13, supplies the selection in logic unit 21, register 15 supplies that in unit 23, and register 17 controls selection in signal combiner unit 25.

The signal combiner units 19, 21, 23 and 25 each contain two data inputs, each of which is connected to the output of a separate one of two MUXs, enabling a signal combining function of events from two of the individual functional units. For clarity, the signal combiners inputs are labeled with the encircled number of the particular two of the four MUXs, 27, 29, 31 and 33, whose outputs are connected respectively to two inputs of a respective signal combiner unit, and whose events may be combined, if desired, as later herein described more fully. Thus, the output from MUX 33 connects to one input of signal combiner units 19 and 21, the output of MUX 31 connects to one input of signal combiner units 21 and 23, and so on as illustrated in the figure.

In this embodiment, counters 3, 5, 7 and 9 are configured to decrement from a set number. A desired number or count is written into the counter, suitably by computer 38 via bus 35. Each time an input is received, the count decrements. Once the counter decrements to below zero, it produces an output. That output is a change of sign at its MSB or polarity "sign" output, from digital "0", representing positive numbers, to digital "1", representing negative numbers.

Counters of this design continue to decrement past zero and count negative numbers, decrementing the negative number with each additional input until a maximum number is attained. When that maximum is attained, the counter resets, changing its MSB or sign output to positive and, with additional input pulses, decrements from that maximum positive number. This counter configuration is well known and its design is available in the technical literature.

Figure 2:
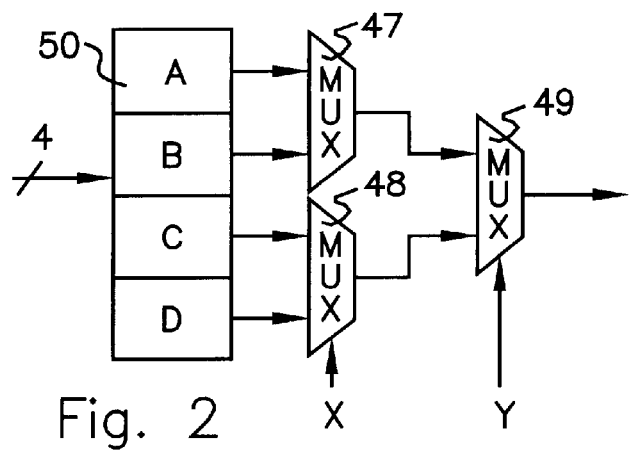
FIG. 2 is a schematic of a logic selection circuit employed in a component of the embodiment of FIG. 1.

Continuing with FIG. 1, each signal combiner 19, 21, 23 and 25 includes a "bit wise" Boolean logic circuit that provides all sixteen possible functions based of two inputs. Such a logic selection circuit is well known to those skilled in the art and is described in the literature for "C" programming. Such a selection circuit may be formed of three MUXs, such as schematically illustrated in FIG. 2, to which reference is made. This hardware contains three dual channel MUXs 47, 48 and 49, a selection register 50 containing blocks labeled A through D, representing four bits of function selection data. X and Y represent the two inputs that are to be logically combined. The output of MUX 49 is the combination of channels X and Y specified by the high or low state of blocks A through B in the selection register.

TABLE 1

Part 1

Value of Signal Combining Function

| input values | | 0 | 1 | 2 | 3 | 4 | 5 | 6 | 7 | |
|---|---|---|---|---|---|---|---|---|---|---|
| X | Y | Disabled (false) | !(X|Y) | !X&Y | !X | X&!Y | !Y | X^Y | !(X&Y) | BIT |
| 0 | 0 | 0 | 1 | 0 | 1 | 0 | 1 | 0 | 1 | 0 |
| 0 | 1 | 0 | 0 | 1 | 1 | 0 | 0 | 1 | 1 | 1 |
| 1 | 0 | 0 | 0 | 0 | 0 | 1 | 1 | 1 | 1 | 2 |
| 1 | 1 | 0 | 0 | 0 | 0 | 0 | 0 | 0 | 0 | 3 |

With this signal combiner, a single output value, the selection, is defined for each of the four possible combinations of event input signals passing through the MUX=s. The following tables 1-part 1 and 1-part 2 show the values used to specify logic functions on the two input signals, designated X and Y in the tables, supplied by a pair of MUX=s. The X-Y signal pairs for counters 3, 5, 7 and 9 are MUX pairs 27 & 33, 31 & 33, 29 & 31, and 27 & 29, respectively. The tables use C-Boolean notation. Symbol "&" in the table represents the "bitwise" AND operation; symbol "|" represents the Inclusive OR operation; symbol "^" represents the Exclusive OR operation and symbol "!" represents a NOT operation.

TABLE 1

Part 2

| input values | | 0x8 | 0x9 | 0xa | 0xb | 0xc | 0xd | 0xe | 0xf | |
|---|---|---|---|---|---|---|---|---|---|---|
| X | Y | X&Y | !(X^Y) | Y | !(X)\|Y | X | X\|(!Y) | X\|Y | True Clocks | BIT |
| 0 | 0 | 0 | 1 | 0 | 1 | 0 | 1 | 0 | 1 | 0 |
| 0 | 1 | 0 | 0 | 1 | 1 | 0 | 0 | 1 | 1 | 1 |
| 1 | 0 | 0 | 0 | 0 | 0 | 1 | 1 | 1 | 1 | 2 |
| 1 | 1 | 1 | 1 | 1 | 1 | 1 | 1 | 1 | 1 | 3 |

The versatility of the signal combiner units permit counts of individual events and that of combined events, referred to as combinational logic. As example, assuming first that one wishes to count only the events occurring at one of the functional units without combining that event with any other for the count, say that represented by input X in the table, which corresponds to the output from one MUX, and disregards input Y, the second MUX. Locating column 0xc in part 2 of the table, one finds an X ONLY representation. This means that the output will only be that of signal input X. Comparing the four bits in this column with the four bits in the input values for X in the extreme left column confirms that the case. The bit code to apply to the signal selection input of the combiner for that selection is the same string of ones and zeros. With that code entered into signal combiner unit 19 only the output from MUX 33 is counted at an event.

Likewise if only the input at Y is to be provided, the bit code for that operation is found in column 0xa (11 Hexadecimal) of part 2 of the table, which is the truth table values for that operation. Again considering logic unit 19, as further example, only the output from MUX 27 is counted as an event.

When, however, one desires a count only when an event occurs at both locations represented by X and Y, in other words the Boolean X AND Y logical value, both X and Y inputs must be "true" before a count is made. The selection of that combinational logic value is found in column 0×8. As shown in the column, the truth table values for that Boolean relationship and the bit values to identify the AND operation are given. X and Y are both True in the fourth row.

Assuming those selection bit values are programmed into the selection input to signal combiner unit 19, then the event is counted only if event signals are received at and are present at the selected inputs of MUXs 27 and 33 concurrently. Thus, a large variety of different Boolean logic operations are available for selection. Although available, as one appreciates, not all those combinations will likely be used in this counter system in every type of processor system.

The signal combiners 19, 21, 23, and 25 also include edge detect mode and level detect mode circuitry of conventional design, illustrated in block form, such as blocks 19a and 19b in signal combiner unit 19, 21a and 21b in unit 21 and so on for units 23 and 25. The signal combiners are, by default, in the level detect mode. When desired, they are set to the edge detect mode, also accomplished through software control.

The "edge" and "level" terminology, as may have been adapted as a shorthand expression from the art of pulse voltage measurement, in which a pulses leading edge and its duration are observed characteristics might cause some readers, more acquainted with measurement technology, to initially misunderstand the operation of those circuits. To avoid confusion, it should be understood that what is referred to herein as "edge" detection is perhaps more accurately described to mean, as intended, the occurrence of an event, that is, an event has started or occurred, even if only briefly. And what is referred to herein as "level" detection is perhaps more accurately described as meaning, as intended, the duration of an event, that is, the length of time an event signal (or condition) persists.

Thus in "level" sensitive mode, the default mode, a counter is to count the number of clock cycles in which the event is determined to be TRUE (logical "1") and represents the duration of the event. The "edge" detect logic events are counted on clock cycles when they are TRUE, but were FALSE (logical "0") in the preceding cycle. Thus in "edge" detect mode, a count is taken of the number of times that the event undergoes transition from FALSE to TRUE.

As example, considering the familiar cache miss event. In level mode, the total number of clock cycles in which the processor found in the cache miss state are counted. In edge mode the number of cache misses are counted. With both those counts on hand, one is able to determine the average number of clock cycles per cache miss. That average is a useful performance statistic.

Figure 3:
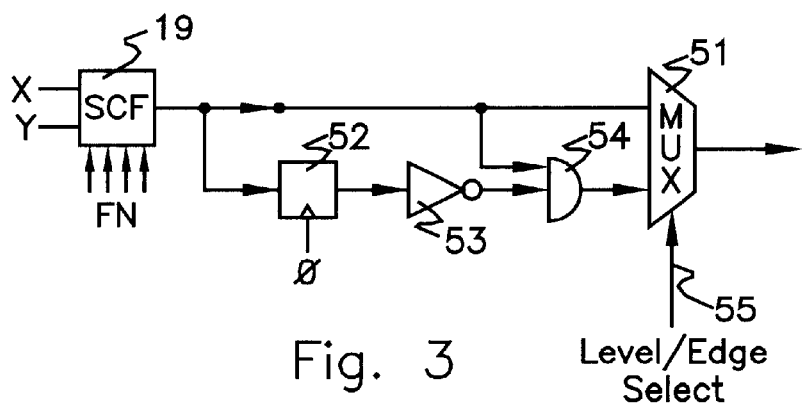
FIG. 3 schematically illustrates a switchable edge and level detection circuits used in the embodiment of FIG. 1.

An implementation of the circuit for edge and level detection is illustrated schematically in FIG. 3 to which reference is made. A signal combiner 19 to which the X and Y inputs (event signals) are applied for combining output to one channel of a MUX 51. An input of a D-flip-flop 52 connects to the output from the combiner. The control input of flip-flop 52 is held at logical "0". In turn the output of the flip-flop is applied to the input of NOT gate 53, and the output of that NOT gate is input to one input of an AND gate 54. The second input of AND gate 54 is also connected to the combiner output.

The select input 55 to MUX 51, in default condition, remains at a logical "0", hence it passes the output of the combiner to the MUX output. When, however, the select input of the MUX is set to logical "1", its output is supplied through its second channel input that is connected to the output of AND gate 54. When D flip flop 52 receives a "1" signal it changes and resets, momentarily changing its output from "1" to "0" and then back to "1". The negative going pulse is inverted and applied to an input of AND gate 54, which, with the digital "1" present at its other input, provides an output to MUX 51 for the momentary duration of the flip-flops "0" output pulse.

As long as the "1" remains at the flip-flops input, the flip-flop cannot again generate the negative going pulse. It can do so only when the event output from signal combiner 19 terminates. Thus the output from MUX 51 represents when a combined event starts or occurs, the edge detection, and not the duration of the event. Such detection units preferably are included at the output end of the signal combiner units, although they may also be placed at the input end if desired.

In addition to the logical selection being made through the codes stored in the associated control register, that register also supplies the codes to make the selection of either edge detection or level detection modes.

Where necessary, for correct operation all events should be synchronized to the same pipeline stage before being sent to the event combining logic (signal combiner). That synchronization ensures that event signals, which might not be in phase and not overlap as could result in signals arriving at the combining logic at different times and, hence, could not be combined, are presented to the combining logic at the same time. By holding back one event signal, delaying its transmission, and/or extending its duration, until the other signals catch up, the two signals can both be present at the same time, and, hence, permit effective combining. Such delay or holding circuits are (or should be) incorporated in the functional units to handle those event signals originating from the respective functional units as may be found to require such delay or hold-back. Synchronization is therefore important to allow multiple events to be combined in a meaningful way, and also to make the global kill signal meaningful. In the '205 Kelly patent system, later herein more fully described, a global kill signal is only generated by instructions in the execution stage. Some events, such as interrupts, are inherently asynchronous and there is no meaningful way to synchronize them the EM stage.

Figure 4:
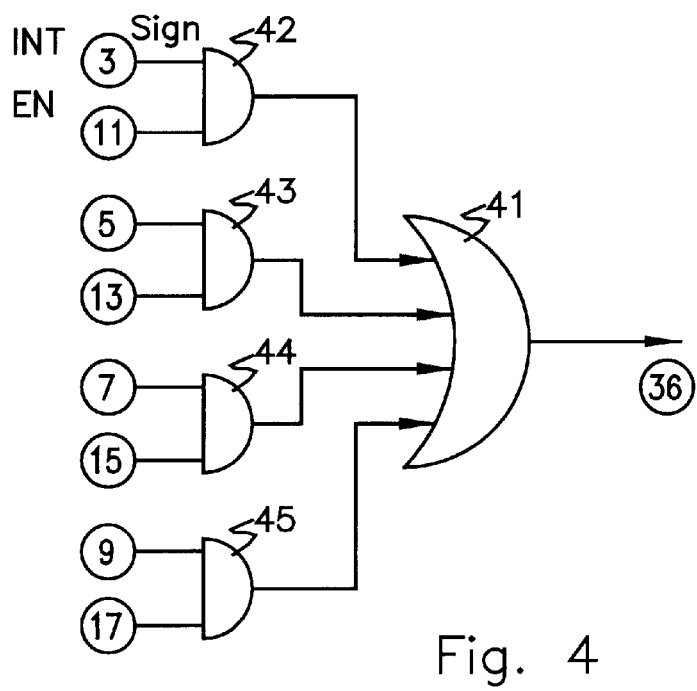
FIG. 4 schematically illustrates a gating circuit employed with an output of the counters used in the embodiment of FIG. 1 to generate an interrupt signal.

Reference is made to FIG. 4, schematically illustrating the content of gate 40 of FIG. 1 through which the system provides an interrupt should any of counters 3, 5, 7 or 9 attain the respective particular number programmed. This gate contains an OR gate 41 and four AND gates 42–45. The output of those AND gates are input to the OR gate. One input of each respective AND gate couples to the MSB or sign output of one of the counters. As indicated the sign output of counter 3 couples to one input of gate 42. The other input to that AND gate is coupled to the interrupt enable terminal of the control register associated with the respective counter. In the example given, the second input to AND gate 42 is coupled to the output of control register 11. Like connections from the other counters and their associated control registers are connected to the inputs of the other AND gates as indicated by the lead numbers in the figure.

When a particular counter is to generate an interrupt on attainment of a prescribed count, "interrupt enable" information is loaded into the associated control register simultaneously with the other digital information written herein. That interrupt enable is a "1" at a particular position in the word format written into the control register, later herein described more fully. If not, that particular bit remains at a "0". The interrupt enable information in the control register is present at the output of the register, and is presented at one input to an associated AND gate. As example, assuming that counter 3 is interrupt enable, lead 11 into AND gate 42 is a digital "1". The AND gate can change its output to digital "1" only if both of its inputs are at digital "1". If either gate input is at "0", the AND gate does not change its output. Which remains a "0".

As earlier described, when counter 3 attains its count, that is, decrements past zero, its MSB or sign output is changed from a digital "0" to a digital "1". With both inputs thus to AND gate 42 being "1", the AND gate changes its output to digital "1". OR gate 41, which outputs a digital "1" if any of the AND gates output a digital "1", responds and provides the digital "1" output, which serves as the interrupt signal. In like manner, interrupts may be provided by any of the other counters on attainment of count when the respective control registers of the counter are programmed as interrupt enabled.

For operation, the programming scientist decides what events are to be counted. The person selects up to four of the events, and decides whether the events should be combined for a count or counted individually. If the decision is to combine the events, the person decides how to combine them to generate four counter signals. The person programs the information into the test data set and sends that information to the counter controls accordingly.

An example of a possible format for a 32-bit word for the control register is represented by the following chart, showing the content and the boundary bit positions for each section of the word:

| 31 | 14 | 13 | 10 | 9 | 8 | 7 | 6 | 5 | 4 | 3 | 0 |
|---|---|---|---|---|---|---|---|---|---|---|---|
| 0 | | ES-Event unit | Select | Wire | | | IP | IE | GK | M | SCF |
| 18 | | | 4 | 2 | | | | | | | 4 |

As illustrated, in this example bit positions 14 through 31 are not used.

Separate 32 bit words are used to provide the count for the respective counters. The thirty-two binary bit positions in the count word allows insertion of a very large number in the counter, which is desired on occasion and depends on whether the counter is employed to generate an interrupt or simply to permit one to tally a count after a predetermined lapse of time.

The 6-bit section of the word marked Event Select selects the event signal from among all those event signals sent by the functional units to the described counter unit. The selection is accomplished through specification of the functional unit that originates the signal and the electrical lead or wire on which that signal is sent to this counter unit.

The UNIT designation refers to the Unit Index Select. Each of the functional units within the processor is assigned identification. This 4-bits of data identifies the functional unit within the computer that originates the monitored event. The unit originating the event is mnemonically indicated in the description of the event.

The WIRE designation is the Wire Selector. The 2-bits in this block identifies which of the four wires from the selected functional units should be selected for this event counter. The wire on which the event is sent is determined by an event select register in the counter unit.

The IE designation refers to the Interrupt Enable. As earlier described, a counter may be used to generate an interrupt. The digital bit at this position indicates whether the counter is to generate that interrupt. A "0" in this position instructs that no interrupt is to be generated. A "1" at that position commands the counter to generate an interrupt. The interrupt should be of the priority specified in the Interrupt Priority Field IP, later herein described, if the most significant bit, MSB, bit 31, of the counter is 1. Since the preferred embodiment of the control unit employs decrementing counters, the interrupt is generated when the count specified in the CNT block of this word, later herein described, decrements to a negative value.

The IP designation refers to the Interrupt Priority. For added versatility to the counter system, priority level identifiers may be included. This data bit specifies the priority of the counter interrupt requested when bit 31 of this counter is a digital 1. The high priority counter interrupt is higher than the normal high priority used by the processor. It should be understood that the processor within which this counter system is incorporated should have the necessary capability to detect, use and act upon this priority information. For code profiling (performance analysis) application a high priority is generally used. A watchdog timer application would also likely use this high priority. Should interrupt priority not be of concern in a specific processor system, the bit position may remain unused.

The designation GK refers to Global Kill Processing, the term used herein to represent the function of canceling all operations currently in the processor pipeline, a common operation in many processors, but referred to by other names. During operation of the processor in which the invention is resident, the processor or one of its functional units, such as those being monitored, may generate a global kill signal. As example, such a global kill signal originates from a functional unit within the system described in the '205 Kelly et al patent, elsewhere herein described. For added programming versatility the invention thus is preferably structured to respond accordingly or not, as desired by the test operator. Thus, a "0" in this block of the digital word indicates that a global kill signal is to be ignored, ie., the event is counted if signaled, despite the existence of a global kill command issued by the processor in which the present invention is resident. A "1", however, indicates that the kill signal applies, in which event, the event signaled to the counter from the functional unit is not to be counted during the cycle of processor operation to which the kill signal applies.

The designation M represents the Count Mode. This data block specifies when the counter should count the signal that is the output of the Signal Combining Function. A "0" at this location commands the counter to trigger a count based on duration of the inputted signal, to count during each clock cycle of the processor clock that the signal is true. On the other hand, a "1" commands the counter to trigger its count based on occurrence of edge detection (occurrence), that is to count when the received signal changes from False to True.

The designation SCF represents the Signal Combining Function. The data at these bit positions defines a single output value for each of the four possible combinations of two event input signals. The digital logic circuits associated with each counter, elsewhere herein described in greater detail, permits two separate events, as example, to be combined. This counter unit is capable of providing that information. Selection is described in "bitwise" Boolean logic with a "truth table" presented earlier herein. Because this logic component is serially connected to the counter inputs, one of the commands is to allow input from only one of the MUX inputs, thereby counting only the individual event associated therewith.

Each counter contains a 32-bit (binary) count register. This count register can be read from and written to by software via bus 35. Through a software read operation initiated through computer 38, the software scientist running a performance analysis (or the computer program itself) may at any time inspect the count in the counter. The register decrements the number contained in this register according to the event select and processing logic earlier described. When the count decrements to below zero, that is, to a negative number, that count has been achieved.

If the processor system is running at the time of the test, the counters are, perhaps, already counting and should first be halted. To do this a "0" is written into the Counter Control Register for the counter. This action disables interrupt generation and disables counting by setting the signal combining function field to output a constant "false" signal.

Operation is relatively straightforward. With the specified counts programmed into counters 3, 5, 7 and 9 and the desired selections installed in the respective control registers 11, 13, 15 and 17, the selector of the MUX establishes the leads associated with the source in a particular functional units selected for count, and the respective signal combiners establish the specified event or combination of events to be counted by an associated counter. Assuming counter 3 is to monitor an event at one source in functional unit 12, MUX 27 establishes a path to signal combiner 19, which has been set to permit only that input 27 to pass through to the counter. The events are thereby counted. When the count specified in counter 3 is attained, an interrupt signal is furnished by the counter to gate 40 and that gate in turn sends the interrupt over bus 36 to the computer. Interrupts are only generated if the control registers are set to enable them.

Likewise when the count desired is to count a combination of events, as example, one source from functional unit 12 and another from functional unit 16, MUXs 27 and 33 are selected to monitor those sources and apply their respective outputs to signal combiner 19. That signal combiner permits an output to the counter only when input signals of events occurring at both sources are applied to the respective two inputs of the signal combiner. As before, when the count is attained, counter 3 outputs an interrupt that is applied to gate 40 and from that gate is sent to the computer 38 over bus 36.

It should be appreciated that all of the other counters may be running counts simultaneously. That operation, being essentially the same as before, need not be separately described.

Although the signal combiner employed in the preferred embodiment offers a wide range of possible selections, as those skilled in the art appreciate, other signal combiners may be substituted as permits a lesser number or variety of selection options, without departing from the scope of the invention.

Additionally, the foregoing embodiment hard-wires or ties two MUXs to two signal combiner units and in turn those MUXs are hard-wired to specific functional units within the processor. Any two events can be combined for an individual counter. However, since each event select MUX tree is shared between two counters in the practical embodiment illustrated, each event selected for a given counter is also input to the signal combining function for an adjacent counter, posing a slight restriction in application. It is appreciated that the foregoing embodiment may be modified, for greater versatility, with a further selection circuit that would permit one to change which MUX outputs are connected to particular signal combiner units.

Further, the embodiment of FIG. 1 may be further enhanced with additional levels of select logic to form alternative embodiments capable of monitoring even more complex operations. Each select logic unit 19, 21, 23, and 25 provides an count based on the prescribed relationship defined by the set combinational logic between activities in only two of the functional units. By adding an additional stage of select logic to receive and monitor the outputs from two of the select logic units shown in the embodiment of FIG. 1, as example select logic units 19 and 21, and presenting the output of that additional select logic to one of the counters, one is able to obtain a count that is based on the prescribed relationship (defined by the combinational logic prescribed) between select logic units 19 and 21. Such a count is thus based on the occurrence of a monitored action in four of the processors functional units. To accomplish such an enhanced embodiment, it is necessary to add an additional control register, like those previously described, to provide the appropriate select inputs to the additional select logic unit. As those skilled in the art appreciate, the described pyramiding of events may be carried even further for monitoring even more complex relationships, although a purposeful reason or necessity for doing so is not presently apparent.

One may also employ three or four input signal combining functions, if desired. In general, the architecture of the foregoing counter system permits N counters, each of which would count based on a function of X independent input events. Such an arrangement requires N-X event select MUX trees. If the numbers chosen for N and X are large, the architecture would call for a very large amount of logic devices, which, as formed on a semiconductor chip, requires a large amount of chip territory. The practical embodiment described provides one manner of saving chip area at the cost of reduced functionality.

The novel counter system is versatile in application. It has particular application to the system described in U.S. Pat. No. 5,832,205 to Kelly et al, granted Nov. 3, 1998, entitled, Memory Controller For A Microprocessor For Detecting A Failure of Speculation On The Physical Nature of A Component Being Addressed (the '205 Kelly patent), assigned to Transmeta Corporation, assignee of the present invention.

The '205 Kelly patent describes, inter alia, a novel computer system, that serves as the host system capable of executing software programs designed with an instruction set intended to run on a computer system of different design, the target system, one that contains an instruction set unique to the target system, but foreign to the host system. It contains software, referred to as code morphing software, and hardware that, among other things, translates instructions that comprise the software program "on-the-fly" into instructions of the host instruction set; and then executes those instructions.

The Kelly et al computer system seeks to optimize by rescheduling, reordering and eliminating translated instructions found unnecessary so that a sequence of instructions executes in a more efficient order. To that purpose it translates instructions sequentially to produce a first sequence of naively translated host instructions and saves that translation in a translation buffer. The code morphing software then attempts to simplify the translation by optimizing the sequence.

However, when such optimized sequence fails to execute for any reason, the processor generates an exception, and executes a process, referred to as a "rollback", returning instruction execution to a prior point of execution at which correct state of the target processor is known. The processor then recommences translation using a "naive" translation, comprised of more elementary instructions, and stores state of the target processor at each step in the sequence of instructions. This allows the processor to be at the correct state when the exception ultimately re-occurs, so that the exception may be appropriately dealt with.

By creating shorter more easily managed instruction translations that take less time to execute, the processor in the '205 Kelly system is often able to run the software program at operational speeds greater than the computer for which the software was originally designed.

During the foregoing optimization process, a number of exceptions or rollback commands are likely to frequently occur initially, and then taper off as the foregoing artificial learning continues. Monitoring those events allows the software to determine whether to further optimize. The new counters can be incorporated within the computer of the '205 Kelly patent to permit the optimizing software to monitor those events.

When included as an essential device in the computer processor=s function, the foregoing counter system may be applied to a particular event to generate a processor interrupt when a predetermined count is made, as may evidence an event occurring too frequently or another reason of interest to the system designer. More specifically, the counters can be applied to generate interrupts periodically by counting clock cycles, ie., time intervals, to detect excessive activity of certain events, such as rollbacks and to provide real-time performance information. The latter information may then be used by code morphing software to alter the behavior of code generation dynamically.

Further, the counter system can be applied to monitor the occurrence of key processor events during normal processor activity, the traditional usage of performance monitors. The information obtained may then be analyzed to understand processor behavior and to calibrate performance simulators. The counters also permit internal logic events to be monitored by software without affecting the operation of the logic. This provides a debugging function.

Monitoring such kinds of events in general allows the engineer or software scientist to learn of potential bottlenecks that could be encountered in the run of a program and other aspects of its behavior not visible through software. This is a performance measurement and timing function that is particularly useful in assisting the designer to develop hardware or software refinements to enhance operation of a new processing system.

Thus, as example, the new counters can be further applied within computers constructed in accordance with the '205

Kelly patent to count the foregoing exception and rollback events, the number of processor stalls occurring, the number of cycles the processor took to complete useful work, the number of times interrupts are globally disabled or were blocked, the number of times exceptions were disabled, the number of mis-predicted branches, and branches taken and a host of other events, which may be of interest to computer and software designers, although not necessary to an understanding of the present invention.

The foregoing description defines a unique and novel counter system which provides a system counting function in which pairs of events are fed into a two-input arbitrary logic block, able to compute any function of the two inputs under program control. Only simple events need to be generated directly. Complex events are essentially synthesized by the combining function.

As an advantage the counter system is constructed of components that are recognized as being of standard design, well known to those in the industry.

It can be used for performance profiling and to debug to identify instructions that trigger certain desired or undesired events. As example a processor chip that appears to run an application too slowly can be analyzed and the fault or problem responsible for the slow-down determined.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In a semiconductor chip, said semiconductor chip including thereon a microprocessor, said microprocessor comprising
   a plurality of functional execution units, wherein, during operation of said microprocessor, each of said plurality of functional execution units serving as a source of event signals, an event counter system, comprising:
      a plurality of programmable event counters, said programmable event counters for counting events generated by at least one respective functional unit during the run of a software application;
      said plurality of programmable event counters being consolidated within a region on said semiconductor chip;
      a plurality of electrical buses extending from within said region for electrical connection to respective ones of said plurality of functional units for coupling event signals occurring at each respective functional unit to said region;
      a plurality of MUXs, each said MUX including multiple input channels, a single output channel, and a selector for enabling selection of the one of said input channels for passage to said output channel, responsive to application of selector control information to said selector; and
      a plurality of signal combinational logic devices, each said signal combinational logic device being capable of prescribing any one of a plurality of available Boolean logic relationships, said combinational logic devices for logically combining signals applied to a pair of inputs in accordance with one of said Boolean logic relationships to produce a desired output only when the signals at said inputs satisfy said one Boolean logic relationship;
      each said signal combinational logic device including a selection input for selecting one of said plurality of Boolean logic relationships, responsive to control information applied to said selection input.

2. The invention as defined in claim 1, wherein said output channel of each of said plurality of MUXs is connected to one input of each of only two of said plurality of combinational logic devices; and wherein one input of said pair of inputs of any of said combinational logic devices is connected to a single one of said plurality of MUX outputs, whereby said combinational logic device is capable of producing an output when two of said plurality of functional units produce event signals that bear the selected Boolean logic relationship selected by said control information; and
   said output of each of said plurality of combinational logic devices being connected to an input of a respective one of said plurality of event counters, whereby each event counter counts an event responsive to an output of an associated one of said combinational logic devices.

3. The invention as defined in claim 2, wherein said selector of each said MUX selects an input channel responsive to application of a digital select code; and
   wherein said control information comprises a digital logic code.

4. The invention as defined in claim 3, further comprising:
   a plurality of control registers, each of said control registers for storing at least a digital select code and a digital logic code;
   each of said control registers being associated with a respective one of said plurality of combinational logic devices and with a respective one of said plurality of MUXs, each said control register containing a first output for sending a stored digital select code and second output for sending a stored digital logic code and an input for receiving said digital select code and said digital logic code;
   said first output of said control register being connected to said selector of said respective MUX and said second output of said control register being connected to said selection input of said respective combinational logic unit.

5. The invention as defined in claim 4, further comprising:
   means for inputting said digital select code and said digital logic code into each of said plurality of control registers.

6. In a semiconductor chip, said semiconductor chip including thereon a microprocessor, said microprocessor comprising
   a plurality of functional execution units, wherein, during operation of said microprocessor, each of said plurality of functional execution units serving as a source of event signals, an event counter system, comprising:
      a plurality of programmable event counters, said programmable event counters for counting events generated by at least one respective functional unit during the run of a software application;
      said plurality of programmable event counters being consolidated within a region on said semiconductor chip;
      a plurality of electrical buses extending from within said region for electrical connection to respective ones of said plurality of functional units for coupling event signals occurring at each respective functional unit to said region;

means for programming at least some of said programmable counters with a respective number to count;

each said programmable counter including an output for providing an output signal on attainment of the number programmed therein; and gating means for providing an interrupt output responsive to an output signal from any of said programmable counters.

7. The invention as defined in claim 6, wherein each of said programmable counters comprise a decrementing counter.

8. The invention as defined in claim 7, further comprising:

a level detection circuit for detecting duration of a signal; and an edge detection circuit for detecting occurrence of a signal;

signal type selecting means for placing a selected one of said level detection circuit and said edge detection circuit in series between an output of said combinational logic device and said associated programmable counter, whereby either kind of signal may be presented to said programmable counter for count.

9. The invention as defined in claim 7, wherein each said combinational logic device provides an output signal that persists for the period of the combination of events being counted; and further comprising:

a plurality of edge detection circuits, one of said edge detection circuits being associated with a respective one of said plurality of combinational logic devices;

each said edge detection circuit for detecting the start of an output signal from an associated combinational logic device, said edge detection circuit having an input for receiving said output signal from said associated combinational logic device and an output for providing output representing the start of said received output signal;

means for selectively switching said input of said programmable counter associated with said combinational logic device from said output of said respective combinational logic device to said output from said edge detection circuit, whereby said programmable counter counts the starts of an event.

10. The invention as defined in claim 4, further comprising: means for programming at least some of said programmable counters with a respective number to count;

each said programmable counter including an output for providing an output signal on attainment of the number programmed therein; and gating means for providing an interrupt output responsive to an output signal from any of said programmable counters.

11. The invention as defined in claim 10, wherein each said combinational logic device provides an output signal that persists for the period of the combination of events being counted; and further comprising:

a plurality of edge detection circuits, one of said edge detection circuits being associated with a respective one of said plurality of combinational logic devices;

each said edge detection circuit for detecting the start of an output signal from an associated combinational logic device, said edge detection circuit having an input for receiving said output signal from said associated combinational logic device and an output for providing output representing the start of said received output signal;

means for selectively switching said input of said programmable counter associated with said combinational logic device from said output of said respective combinational logic device to said output from said edge detection circuit, whereby said programmable counter counts the starts of an event.

12. The invention as defined in claim 10 wherein each of said control registers further includes:

means for receiving and storing an interrupt ENABLE bit and providing an ENABLE bit output, said ENABLE bit output being TRUE when an interrupt is to be generated upon attainment of the count by the programmable counter associated with said control register, and otherwise being FALSE; and wherein said gating means further comprises:

a plurality AND gates, each of said AND gates including first and second inputs and an output, for providing a TRUE output only when both said first and second inputs are TRUE;

an OR gate, said OR gate having inputs coupled to the output of each of said AND gates for providing an output when any of said inputs are TRUE;

said first input of each of said AND gates being connected to the output of a respective one of said plurality of programmable counters; and said second input of each of said AND gates being connected to said ENABLE bit output of the respective one of said control registers associated with said respective one of said plurality of programmable counters.

13. In a semiconductor chip, said semiconductor chip including thereon a microprocessor, said microprocessor comprising a plurality of functional units, an event counter system comprising:

a plurality of programmable event counters, said programmable event counters for counting events generated during the run of a software application by at least some of said plurality of functional units, said plurality of event counters being consolidated at a location on said semiconductor chip;

each said programmable event counters including an output for outputting a signal upon attainment of respective numbers programmed therein for count;

a plurality of output buses connected to respective ones of said plurality of programmable event counters outputs;

a plurality of electrical buses extending from within said location for electrical connection to respective ones of said plurality of functional units for coupling events at each respective functional unit to said location;

a programming bus coupled to said programmable counters for inputting numbers to said respective programmable counters for count;

a plurality of MUXs, each said MUX including multiple input channels, a single output channel, and a selector for enabling selection of the one of said input channels for passage to said output channel, responsive to application of control information to said selector;

a plurality of signal combinational logic devices; each said signal combinational logic device for logically combining signals applied to a pair of inputs to produce a desired output only when the signals at said input satisfy a predetermined logic relationship;

each said signal combinational logic device including a selection input for enabling selection of one logic relationship from amongst a plurality of different logic relationships, responsive to application of control information;

said plurality of different logic relationships including at least:

input 1 ONLY TRUE, Input 2 ONLY TRUE, Input 1 and Input 2 TRUE, Input 1 NOT Input 2 TRUE, Input 2 NOT Input 1 TRUE, and Input 1 OR Input 2 TRUE;

each of said plurality of MUXs including an output connected to one input of each of only two of said plurality of combinational logic devices;

each input of any of said combinational logic devices is connected to a single one of said plurality of MUX outputs, whereby said combinational logic device is capable of producing an output when an output of each of at least two functional units produce events that satisfy the logic relationship selected by said control information;

each of said plurality of combinational logic devices having its output connected to an input of an associated one of said plurality of event counters, whereby each event counter counts an event responsive to an output of an associated one of said combinational logic devices;

each of said combinational logic devices, further including:

a level detection circuit for detecting the duration of an applied signal, an edge detection circuit for detecting occurrence of an applied signal, and selection means, responsive to selection by control information, for selecting between said level detection and said edge detection to place one or the other of said level detection circuit and said edge detection circuit in series between the output of the associated combinational logic device and said input of said associated counter;

a plurality of control registers, each of said control registers being associated with a respective one of said counters;

each said control register being coupled to said communication bus for receiving and registering control information from an external source, said control information including a logical combination for selection by a combination logic device, an input channel for an associated MUX to output, one of said level detection and edge detection circuits, and an interrupt ENABLE bit, said ENABLE bit output being TRUE when an interrupt is to be generated upon attainment of the count by the programmable counter associated with said control register, and otherwise being FALSE;

gating means for providing an interrupt responsive to an output from any of said programmable counters;

said gating means further comprises:

a plurality AND gates, each of said AND gates including first and second inputs and an output, for providing a TRUE output only when both said first and second inputs are TRUE;

an OR gate, said OR gate having inputs coupled to the output of each of said AND gates for providing an output when any of said inputs are TRUE;

said first input of each of said AND gates being connected to the output of a respective one of said plurality of programmable counters; and said second input of each of said AND gates being connected to said ENABLE bit output of the respective one of said control registers associated with said respective one of said plurality of programmable counters.

14. The invention as defined in claim 13, wherein said plurality of functional units includes at least a memory unit, first and second arithmetic and logic units and a floating point unit.

15. An event counting system for monitoring events occurring at functional units within a digital processing system, comprising: a plurality of programmable counters and associated control registers; a like plurality of signal combiner devices, each said signal combiner device being associated with one of said programmable counters and associated control register, each said signal combiner device for generating an output responsive to generation of an event by at least one of said functional units satisfying a preselected logical criteria and applying that output to an associated one of said programmable counters;

each said control register for supplying logical criteria selection information to the signal combiner associated with said counter; and means for programming said control registers and said programmable counters, wherein selection information is loaded into said control registers and a count is loaded into each counter;

each said control register including means for loading count information into the associated register and selection information into the associated signal combiner.

16. A central processing unit on a chip, comprising:

a microprocessor, said microprocessor including a plurality of functional units; and a programmable digital electronic counter system for counting events occurring in at least one of said functional units during operation, said digital electronic counter system including at least four individual programmable digital electronic counters, at least one of said programmable digital electronic counters having an input which can be programmed to select from a plurality of sources of inputs.

17. A central processing unit on a chip, comprising:

a microprocessor, said microprocessor including a plurality of functional units, said functional units defining a source of X independent input events, where X is a whole number; and a programmable digital electronic counter system for counting events occurring in at least one of said functional units during operation;

said digital electronic counter system including at least N individual programmable digital electronic counters, where N comprises a number no less than four;

said digital electronic counter system further including a plurality of N-X event select MUX trees for permitting a plurality of said X events to be selectively monitored at said counter system; and a plurality of N signal combinational logic devices, one associated with a corresponding one of said N digital electronic counters;

each said signal combinational logic device being capable of prescribing any one of a plurality of available Boolean logic relationships, said combinational logic devices for logically combining signals applied to Y inputs, where Y is a number greater than 1 and less than or equal to N, in accordance with one of said Boolean logic relationships to produce a desired output only when the signals at said inputs satisfy said one Boolean logic relationship.

* * * * *